(12) United States Patent
Russell et al.

(10) Patent No.: US 9,970,424 B2
(45) Date of Patent: May 15, 2018

(54) SYSTEM AND METHOD HAVING CONTROL FOR SOLIDS PUMP

(75) Inventors: Steven Craig Russell, Houston, TX (US); Derek L. Aldred, Granada Hills, CA (US); Jeffery Allen Rader, Burbank, CA (US)

(73) Assignee: General Electric Company, Schenectady, NY (US)

( * ) Notice: Subject to any disclaimer, the term of this patent is extended or adjusted under 35 U.S.C. 154(b) by 1829 days.

(21) Appl. No.: 13/419,387

(22) Filed: Mar. 13, 2012

(65) Prior Publication Data

US 2013/0240083 A1   Sep. 19, 2013

(51) Int. Cl.
| | |
|---|---|
| *F04B 19/04* | (2006.01) |
| *B65G 43/08* | (2006.01) |
| *B65G 43/00* | (2006.01) |
| *B65G 31/04* | (2006.01) |
| *F04C 13/00* | (2006.01) |
| *F04C 14/24* | (2006.01) |

(52) U.S. Cl.
CPC .............. *F04B 19/04* (2013.01); *B65G 31/04* (2013.01); *B65G 43/00* (2013.01); *B65G 43/08* (2013.01); *F04C 13/001* (2013.01); *F04C 14/24* (2013.01)

(58) Field of Classification Search
CPC ........ B65G 31/04; B65G 43/00; B65G 33/22; B65G 43/08; F04B 19/04; F04C 13/001; F04C 14/24
See application file for complete search history.

(56) References Cited

U.S. PATENT DOCUMENTS

| | | | | |
|---|---|---|---|---|
| 3,889,588 | A | * 6/1975 | Wollersheim | ......... B30B 9/3025 100/177 |
| 4,274,786 | A | * 6/1981 | Svensson | .................. D21B 1/06 162/18 |
| 4,516,674 | A | * 5/1985 | Firth | ...................... B65G 31/04 100/156 |
| 4,988,239 | A |   1/1991 | Firth | |
| 5,051,041 | A | * 9/1991 | Firth | ..................... F04D 17/161 198/617 |
| 5,052,874 | A | * 10/1991 | Johanson | .................. B65B 1/12 100/147 |

(Continued)

FOREIGN PATENT DOCUMENTS

| | | |
|---|---|---|
| AU | 2007240195 A1 | 7/2008 |
| CN | 1878942 A | 12/2006 |

(Continued)

OTHER PUBLICATIONS

Australian Search Report issued in connection with corresponding AU Application No. 2013201469 dated Mar. 30, 2016.

(Continued)

*Primary Examiner* — Leslie A Nicholson, III
*Assistant Examiner* — Keith R Campbell
(74) *Attorney, Agent, or Firm* — Fletcher Yoder PC (57) ABSTRACT

A system includes a solid feed fuel pump configured to route a solid fuel flow from an inlet to an outlet. The solid feed fuel pump includes an actuated valve that is disposed within the outlet. The actuated valve is configured to adjust a compaction of the solid fuel flow while in the outlet. The actuated valve adjusts the compaction in response to active control based on sensed feedback from the system.

20 Claims, 7 Drawing Sheets

(56) References Cited

U.S. PATENT DOCUMENTS

| | | | |
|---|---|---|---|
| 5,340,241 A * | 8/1994 | Thiele | B65G 53/46 251/147 |
| 5,355,993 A | 10/1994 | Hay | |
| 5,381,886 A | 1/1995 | Hay | |
| 5,402,876 A | 4/1995 | Hay | |
| 5,485,909 A | 1/1996 | Hay | |
| 5,497,873 A | 3/1996 | Hay | |
| 5,551,553 A | 9/1996 | Hay | |
| 5,657,704 A | 8/1997 | Schueler | |
| 6,213,289 B1 | 4/2001 | Hay | |
| 7,444,947 B2 | 11/2008 | Katayama | |
| 8,006,827 B2 | 8/2011 | Aldred et al. | |
| 8,600,647 B2 | 12/2013 | Demura | |
| 9,004,265 B2 * | 4/2015 | Aldred | F04C 2/00 198/642 |
| 9,156,631 B2 * | 10/2015 | Stevenson | B65G 53/66 |
| 9,206,806 B1 * | 12/2015 | Granados | F04D 29/422 |
| 2011/0033268 A1 * | 2/2011 | Craig | B01J 8/002 414/218 |
| 2011/0255961 A1 | 10/2011 | Akundy et al. | |

FOREIGN PATENT DOCUMENTS

| | | |
|---|---|---|
| CN | 202022587 U | 11/2011 |
| CN | 102301118 A | 12/2011 |
| CN | 202729345 U | 2/2013 |
| JP | 31012551 Y | 8/1956 |
| JP | 53105503 A | 9/1978 |
| WO | 9506610 A1 | 3/1995 |
| WO | 199506610 A1 | 3/1995 |
| WO | 2004055436 A1 | 7/2004 |
| WO | 2006004218 A1 | 1/2006 |
| WO | 2011024145 A2 | 3/2011 |

OTHER PUBLICATIONS

Australian Notice of Acceptance issued in connection with corresponding AU Application No. 2013201469 dated Sep. 19, 2016.

Unofficial English Translation of Japanese Office Action issued in connection with corresponding JP Application No. 2013-050197 dated Sep. 20, 2016.

Unofficial English translation of Chinese Office Action issued in connection with corresponding CN Application No. 201310079223.7 dated Jan. 28, 2016.

Search Report and Written Opinion from corresponding EP Application No. 13158497 dated Jun. 21, 2013.

* cited by examiner

SYSTEM AND METHOD HAVING CONTROL FOR SOLIDS PUMP

BACKGROUND OF THE INVENTION

The subject matter disclosed herein relates to a solid feed pump, and more specifically, to a system and method for controlling properties of a solid feed in the solid feed pump.

A solid feed pump is used in a variety of industries to transport a solid feed, such as particulate matter. In general, the solid feed pump transports a solid feed along a moving path from an inlet to an outlet. Different types of solid feeds may be fed to systems downstream for many processes by solid feed pumps. The compaction and permeability of the solid feed may affect the performance of the solid feed pump and downstream processes. However, the compaction and permeability of the solid feed may change with feedstock properties due to variability of upstream processes.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a solid feed fuel pump configured to transport a solid fuel flow. The solid feed fuel pump includes an inlet and an outlet. The solid feed fuel pump also includes a solid feed flow path configured to route the solid fuel flow from the inlet to the outlet. The solid feed fuel pump further includes an actuated valve disposed within the outlet. The actuated valve is configured to adjust a compaction of the solid fuel flow in the outlet in response to active control based on at least one sensed feedback.

In a second embodiment, a system includes a solid feed pump controller configured to provide active control of a fluid actuated valve based on at least one sensed feedback. The fluid actuated valve is coupled to an outlet of a solid feed fuel pump. The active control is configured to adjust a compaction of a solid fuel flow in the outlet of the solid feed fuel pump.

In a third embodiment, a method includes actively controlling a fluid actuated valve based on at least one sensed feedback. The fluid actuated valve is coupled to an outlet of a solid feed pump. Actively controlling the fluid actuated valve includes adjusting a compaction of a solid flow in the outlet

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments include systems and methods for adjusting the compaction of a solid fuel flow in the outlet of a solid feed fuel pump. An actuated valve within the outlet may be used to adjust the compaction. For example, the actuated valve may be a fluid actuated valve (e.g., hydraulically actuated valve or a pneumatically actuated valve) or an electrically actuated valve. Furthermore, the actuated valve may be a rotary actuator. The actuated valve may adjust the compaction of the solid fuel flow by a linearly movable valve member or a rotatably movable valve member. For example, the rotatably movable valve member may include a hinged valve flap. Additionally, a controller may be configured to actively control the actuated valve based on sensed feedback from a source upstream such as a fuel preparation system coupled to the pump inlet, from a source downstream such as a gasifier coupled to the pump outlet, or from the solid feed pump itself. For example, the sensed feedback may include an inlet pressure, inlet feedstock properties, an outlet pressure, the torque of the solid feed fuel pump, the position of the actuated valve, the load on the actuated valve, a leakage of the solid feed fuel pump, or combinations thereof.

The disclosed embodiments may ensure proper pump operation at startup by providing a seal to the high pressure environment downstream of the pump. For example, the actuated valve may pre-form a seal at pump startup so isolate the pump from the downstream system (e.g., gasifier), increase pressure of the solid fuel flow, and/or increase compaction of the solid fuel flow. In some embodiments, the actuated valve compresses the solid feed flow (e.g., fuel) to control the compacting of the solid feed flow, thereby forming a dynamic seal. In addition, the actuated valve may be controlled to close quickly to isolate the pump from the downstream system. In some embodiments, the actuated valve may provide an adjustable level of resistance on the solid feed flow to reduce variations in pump performance in terms of the pump pressure, torque, leak rate, and flow rate. For example, to reduce pump leak fluctuations, the force exerted by the actuated valve on the solid feed flow may be adjusted to affect the level of compaction and permeability. A solid feed pump operating at a low outlet pressure may be operating with low torque, and a solid feed pump operating at a high outlet pressure may be operating with high torque. An actuated valve may increase the pressure on the solid feed flow to increase both the torque of the pump and outlet pressure. Finally, active control of the actuated valve by a controller may permit adjustments to be made for varied feedstocks through control logic to impact pump performance without necessitating adjustments to hardware. For example, the controller may enable a shift from one feedstock to another while maintaining relatively the same level of pump and system efficiency. This may improve the pump performance and provide greater operational flexibility for the solid feed pump.

Figure 1:
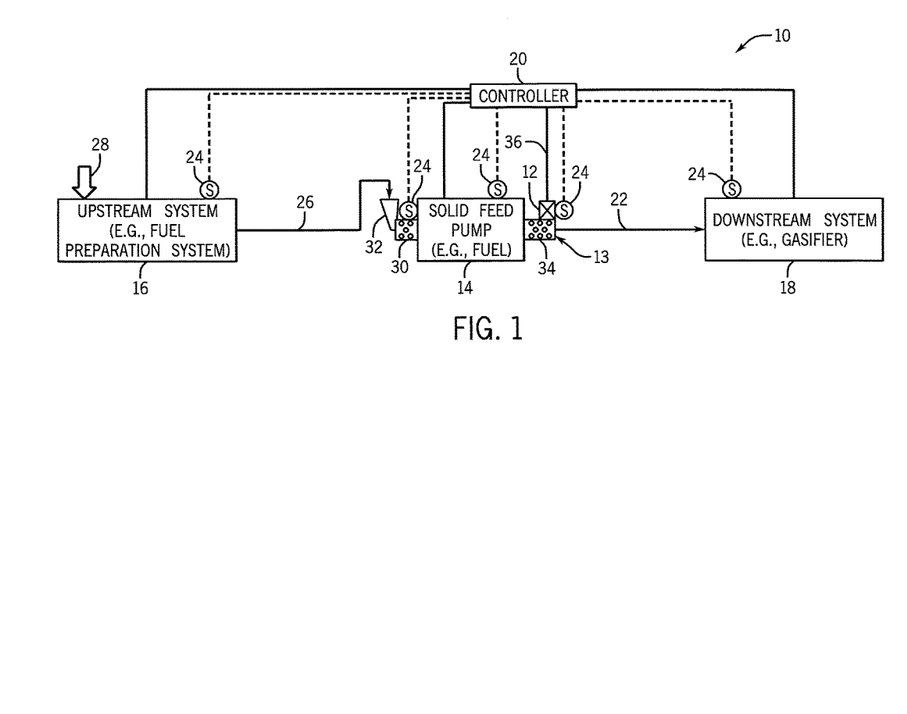
FIG. 1 is a schematic block diagram of an embodiment of a system for actively controlling a valve disposed at the outlet of a solid feed pump.

Turning to the drawings, FIG. 1 illustrates a block diagram of an embodiment of a system 10 utilizing an actively controlled actuated valve 12 to control a dynamic seal 13 (e.g., solids compaction) in a solid feed pump 14 between an upstream system 16 (e.g., fuel preparation system) and a downstream system 18 (e.g., reactor, gasifier, or combustor). The solid feed pump 14 conveys a solid feed flow 22 from the upstream system 16 to the downstream system 18 in a controlled manner to maintain or improve the operating characteristics of the downstream system 18, such as pressure, temperature, and efficiency among others. In some embodiments, the system 10 may be a pneumatic conveying system 10, in which the solid feed pump 14 may convey a solid feed flow 22 of various compositions including, but not limited to, plastics, chemicals, minerals, pharmaceuticals, and/or food products. In other embodiments as discussed below, the system 10 may be a gasification system, in which the solid feed pump 14 may convey a solid fuel flow 22. For clarity, the embodiments discussed below pertain to solid feed pumps 14 that convey a solid fuel flow 22, however the embodiments are not limited to such solid fuel flows 22. A controller 20 may adjust the properties of the solid feed flow 22 through an actuated valve 12 based on feedback received from sensors 24 in the upstream system 16, the solid feed pump 14, the fluid actuated valve 12, the downstream system 18, or combinations thereof, as described in detail below. In addition, the controller 20 may control the upstream system 16, the solid feed pump 14, the actuated valve 12, the downstream system 18, or combinations thereof. The controller 20 may control any operations of these systems 16, 18 and components 12, 14 to affect the properties of the solid feed flow 22.

In certain embodiments, the upstream system 16 (e.g., fuel preparation system) receives solid feed source components 28 (e.g., coal, petroleum coke, biomass, wood-based materials, agricultural wastes, tars, asphalt, or other carbon containing items) to produce the solid feedstock 26. To prepare the solid feedstock 26, the upstream system 16 may resize or reshape the source components 28 by chopping, milling, shredding, pulverizing, briquetting, or pelletizing the source components 28 to generate a solid feedstock 26 (e.g., particulate matter). The solid feedstock 26 is then transported to a solid feed pump inlet 30 of the pump 14.

The solid feed pump inlet 30 receives the solid feedstock 26 for the solid feed pump 14. Because the solid feedstock 26 may not enter the inlet in regular amounts or at a regular rate, the pump inlet 30 may include a reservoir 32 such as a hopper, tank, or other receptacle to contain surplus solid feedstock 26 until it may be pumped through the solid feed pump 14. The solid feed pump 14 may be a Posimetric® pump configured to output or pump a solid feedstock 26 (e.g., dry coal particles) at a high pressure, for example more than approximately 1,000 PSIG. The term "Posimetric" may be defined as capable of metering (e.g., measuring an amount of) and positively displacing (e.g., trapping and forcing displacement of) a substance being delivered by the pump 14. The pump 14 is able to meter and positively displace a defined volume of a substance, such as a solid feedstock 26 (e.g., dry coal particles).

The solid feed flow 22 ejected from the solid feed pump 14 exhibits certain properties. Compaction is a measure of how densely packed the solid particles are in the solid feed flow 22. A highly compacted solid feed flow 22 has low permeability, thus liquids and gases may not pass through the solid feed flow 22 easily. Additionally, a highly compacted solid feed flow 22 may form a good seal within the pump outlet 34, so that liquids and gases also may not pass through the solid feed flow 22. Gas or liquid that does pass through the solid feed flow 22 may be measured as the leakage rate of the solid feed pump 14. As discussed below, the valve 12 is configured to control the compaction of the solid feed flow 22, and thus form a dynamic seal 13 of the solid feed flow 22 in the outlet 24 of the pump 14

The solid feedstock 26 leaves the solid feed pump 14 through the solid feed pump outlet 34 as a solid feed flow 22. The solid feed flow 22 may contain both gases and solids. The pressure of the pump 14 and the upstream system 16 may be different (e.g., less than) from the pressure of the downstream system 18. Accordingly, the solid feed pump 14 may create a dynamic seal 13 (e.g., compacted solids) in the outlet 34, thereby substantially isolating the different pressures in the upstream 16 and downstream 18 systems. However, during transient conditions (e.g., startup), the solid feed pump 14 may not provide an adequate dynamic seal 13 to isolate the upstream 16 and downstream 18 systems without an increase in the compaction of the solid feed flow 22. As discussed in detail below, an actuated valve 12 (e.g., linear valve) disposed in the pump outlet 34 may be actively controlled to extend or retract to adjust the compaction, permeability, and/or flow rate of the solid feed flow 22 to maintain a sufficient dynamic seal 13 (e.g., compacted solids). As the solid feed flow 22 passes through the actuated valve 12, the solid feed flow 22 exerts a load against the valve 12. The valve 12 may be actively controlled to provide an adjustable level of resistance to the solid feed flow 22. The linear actuated valve 12 may completely or partially open or close the pump outlet 34 to adjust these properties of the solid feed flow 22, to block backflow of solids or gases from the downstream system 18, and to selectively isolate upstream system 16 and the solid feed pump 14 from the downstream system 18.

The uniformity and homogeneity of the solid feed flow 22 into the downstream system 18 may affect the efficiency and stability of the downstream system process. (e.g. gasification). The gasification process includes the solid feed flow 22 undergoing a pyrolysis process, whereby the solid feed flow 22 is heated. Temperatures and pressures inside the gasifier 18 may vary during the pyrolysis process, depending on the fuel source components 28 utilized to generate the solid feed flow 22.

A controller 20 may be configured to provide active control by a control line 36 to the actuated valve 12, and thus actively control properties of the solid feed flow 22. The control line 36 may be a fluid conduit or an electrical connection. The controller 20 may provide active control through the control line 36 in response to received sensor feedback from any sensor 24 within the system 10. Sensors 24 may be disposed in the upstream system 16, the pump inlet 30, the solid feed pump 14, the pump outlet 34, the actuated valve 12, the downstream system 18, and combinations thereof. Sensors may include, but are not limited to thermocouples, thermistors, pressure sensors, position sensors, load cells, strain gauges, torque sensors, flow meters, spectrometers, flame sensors, vibration sensors, gasification composition sensors, and combinations thereof.

Sensor feedback may include measurements of pressure, torque, valve position, load, flow rate, leakage rate, temperature, vibration, gas composition, or combinations thereof. For example, a sensor 24 disposed in the upstream system 16 may measure at least one of a flow rate of the source component 28 or solid feedstock 26; a sensor 24 disposed in the pump inlet 30 may measure an inlet pressure or a flow rate; a sensor 24 disposed in the solid feed pump 14 may measure the output torque or vibration; a sensor 24 disposed in the pump outlet 34 may measure an outlet pressure; a sensor 24 disposed in the actuated valve 12 may measure at least one of a valve position, a load on the valve 12, a leakage rate of the solid feed flow 22, or a compaction of a solid feed flow 22; a sensor 24 disposed in the downstream system 18 may measure at least one of a downstream pressure, a solid feed flow rate, a temperature, an efficiency, gasification composition, or emissions. Based on feedback received from these sensors 24, the controller 20 may actuate the actuated valve 12 to adjust the compaction, leakage rate, and or flow rate of the solid feed flow 22. Thus, the controller 20 may affect the other measurements to improve performance of the system 10 or at least components within the system 10 such as the upstream system 16, the solid feed pump 14, or the downstream system 18.

Figure 2:
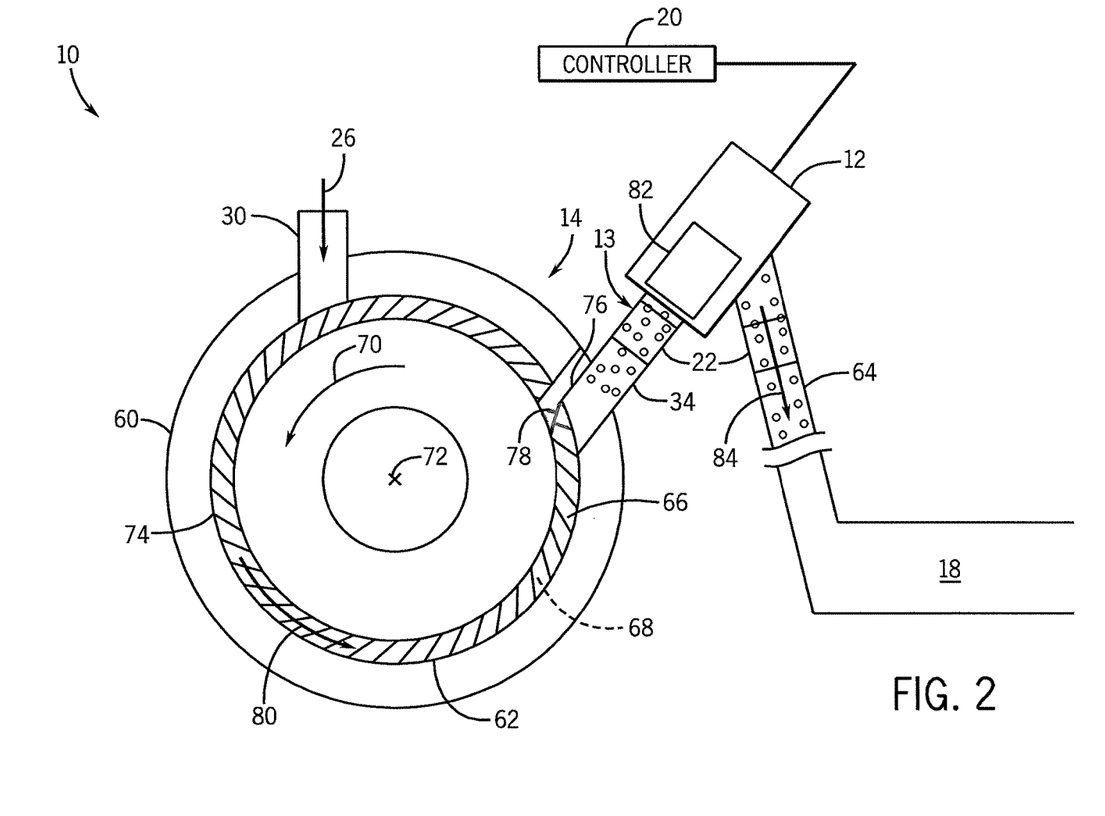
FIG. 2 is a schematic cross-sectional diagram of an embodiment of the solid feed pump of FIG. 1 with an actuated valve in the outlet.

FIG. 2 is a schematic diagram of an embodiment of the solid feed pump 14 and the actuated valve 12, as shown in FIG. 1. As shown in FIG. 2, the solid feed pump 14 includes a housing 60, inlet 30, outlet 34, and rotor 62. The solid feedstock 26, upon entering the solid feed pump 14 via inlet 30, is transported from low to high pressure before being discharged from the outlet 34 of the solid feed pump 14 into the exit pipe 64 to the downstream system 18. In the illustrated embodiment, the rotor 62 includes two substantially opposed rotary discs 66, 68 to drive solid feedstock 26 through the solid feed pump 14. The rotary discs 66, 68 are movable relative to the housing 60 in a rotational direction 70 about the axis 72 from the inlet 30 towards the outlet 34. The inlet 30 and the outlet 34 are coupled to a curved passage 74 (e.g., circular or annular passage) disposed between the two rotary discs 66, 68 and within the housing 60. A solid feed guide 76 is disposed adjacent the outlet 34.

The solid feed guide 76 extends across the curved passage 74 between rotary discs 66, 68. The solid feed guide 76 includes a guide wall 78. The guide wall 78 may receive the feedstock 26 between the discs 66, 68 and direct the feedstock 26 along the feed guide 76 to the outlet 34.

As the particulate matter of the solid feedstock 26 is fed through the inlet 30, the solid feed pump 14 imparts a tangential force or thrust to the particulate matter 26 in the rotational direction 70 of the rotor 62. The direction of flow 80 of the particulate matter 26 is from the inlet 30 to the outlet 34. As the particulate matter 26 rotates through the curved passage 74, the particulate matter 26 encounters the guide wall 78 of the solid feed guide 76 disposed adjacent the outlet 34 extending across the curved passage 74. In passing through the curved passage 74, the particulate matter 26 becomes compacted and exits the pump 14 at a generally constant rate and pressure. The compacted solid feed flow 22 may form a dynamic seal 13 or bather between the downstream system 18 and the low pressure region inside the pump 14 and upstream of the pump 14. The solid feed guide 76 routes the particulate matter 26 through the outlet 34 into a valve chamber 82 as the solid feed flow 22. In some embodiments, the particulate matter of the solid feedstock 26 flows downward from the valve chamber 82 by gravity, as generally indicated by arrow 84, into a downstream system 18. In other embodiments, the particulate matter of the solid feedstock 26 may be entrained in an upward flow in chamber 82, or other conveying flow direction.

In some embodiments, in the event that the solid feed flow 22 does not form an effective seal, the actuated valve 12 may be actively controlled to partially extend into the valve chamber 82 to increase the compaction of the solid feed flow 22, thereby increasing the effectiveness of the dynamic seal 13 (e.g., compacted solids). In addition, the actuated valve 12 may fully extend into the valve chamber 82 to close the outlet 34, thereby completely isolating the upstream system 16 and the solid feed pump 14 from the downstream system 18. A dynamic seal 13 (e.g., compacted solids) may block liquid or gases from passing through the solid feed flow 22 (e.g., through the solid feed pump 14) between the upstream system 16 and the downstream system 18. The effectiveness of the dynamic seal 13 may depend on the pressure and/or the compaction of the solid feed flow 22 in the outlet 34, and thus the actuated valve 12 controls the solids compaction to increase or decrease the effectiveness of the dynamic seal 13 based on various feedback. In some embodiments, when the solid feed flow 22 is sufficiently compacted, the actuated valve 12 may partially or fully retract from the valve chamber 82 to increase the solid feed flow 22. In other embodiments, the actuated valve 12 may be actively controlled by the controller 20 to extend only an intermediate amount into the valve chamber 82. This may increase the pressure of the solid feed flow 22 and/or increase the compaction while maintaining a flow rate through the pump outlet 34. In certain embodiments, the controller 20 may actively control the actuated valve 12 to increase the compaction of the solid feed flow 22 to provide an effective dynamic seal 13 for a higher pressure in the downstream system 18 or a greater pressure differential between the upstream 16 and downstream 18 systems. Likewise, the controller 20 may actively control the actuated valve 12 to decrease the compaction of the solid feed flow 22 to provide an effective dynamic seal 13 for a lower pressure in the downstream system 18 or a lower pressure differential between the upstream 16 and downstream 18 systems.

Figure 3:
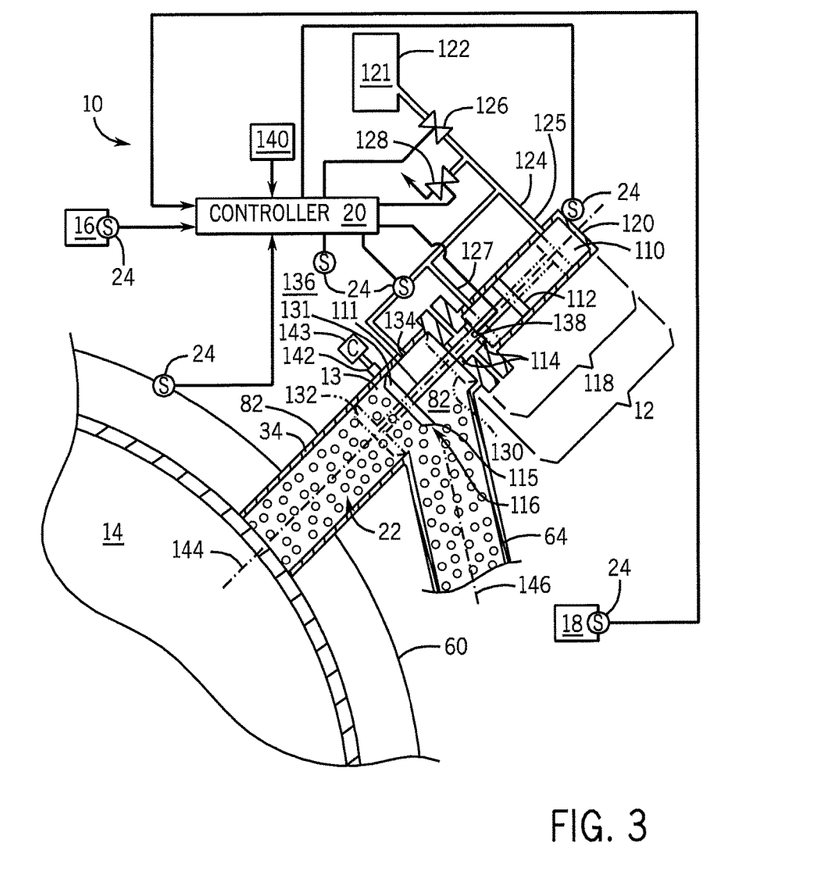
FIG. 3 is a schematic cross-sectional diagram of an embodiment of a linearly movable fluid actuated valve and controller for the solid feed pump of FIGS. 1 and 2.

FIG. 3 is a schematic cross-sectional diagram of an embodiment of a fluid actuated valve 12 and the controller 20, wherein the valve 12 is a linearly movable fluid actuated valve 12 to control the dynamic seal 13 (e.g., solids compaction) in the outlet 34. As discussed above, the actuated valve 12 may include but is not limited to a fluid actuated valve or an electrically actuated valve. For clarity, discussion of embodiments with a fluid actuated valve 12 may generally be applicable with an electrically actuated valve 12. In the example illustrated in FIG. 3, the fluid actuated valve 12 may include a pressurization chamber 110, a rod 111, a piston 112, a seal 114, and a valve member 116 (e.g., linearly movable valve member or valve head 115 and rotatably movable valve member), which are assembled together as a fluid actuated valve assembly 118. In some embodiments, the fluid actuated valve 12 may be a single or double acting valve. In certain embodiments, a portion or subassembly of a pneumatic fluid actuated valve 12 (e.g., pressurization chamber 110, rod 111, piston 112, seal 114, and other ancillary equipment) may be manufactured by DADCO, Inc. of Plymouth, Mich. In such an embodiment, a portion of the valve 12 (e.g., valve member 116) may be customized for the fluid actuated valve 12. In some embodiments, a portion or subassembly of a hydraulic fluid actuated valve 12 may be manufactured by Parker Hannifin Corp. of Cleveland Ohio. In other embodiments, a portion or subassembly of an electrically actuated valve may be manufactured by Duff-Norton of Charlotte, N.C. Moreover, some embodiments of the actuated valve 12 (e.g., pneumatic, hydraulic, electric) may be manufactured by other manufacturers. For example, the valve member 116 (or the entire actuated valve 12) may be manufactured by General Electric Company of Schenectady, N.Y. The actuated valve 12 may be disposed in a valve housing 120 adjacent to the valve chamber 82. Various arrangements of actuated valves 12 and valve members 116 of different geometries may be utilized to affect the compaction and permeability of the solid feed flow 22.

The fluid actuated valve 12 may be driven over a linear path of movement by a variety of fluids 121, e.g., liquids, gases, steam, or any combination thereof. In some embodiments, the fluid actuated valve 12 may be a hydraulically actuated valve, which may be actuated by a high pressure hydraulic fluid. Exemplary hydraulic fluids may include oil, water, or various other liquids. In other embodiments, the fluid actuated valve 12 may be a pneumatically actuated valve, which may be actuated by a high pressure gas. Exemplary gases may include air or inert gases, such as nitrogen. The fluid actuated valve 12 also may be actuated by steam or various downstream pressure sources. In some embodiments, the pressure of the high pressure fluid 121 used to actuate the fluid actuated valve 12 may be approximately 1000 to 2000 psi. The high pressure fluid 121 may be injected into the pressurization chamber 110 from a high pressure reservoir 122 through a fluid conduit 124 to extend or retract the valve member 116 in the valve chamber 82. The high pressure fluid 121 may be contained within the pressurization chamber 110 by the seal 114. In some embodiments, a double acting valve 12 may have an at least two fluid lines 125, 127 at opposite ends of the pressurization chamber 110 to actuate the piston in two directions. In some embodiments, as described below, a plurality of seals 114 may block the high pressure fluid 121 from entering the valve chamber 82 and may likewise block particulate matter or gases from the valve chamber 82 or downstream system 18 from entering the pressurization chamber 110.

In some embodiments, a controller 20 may direct fluid 121 from the high pressure reservoir 122 into the pressurization chamber 110. For example, the controller 20 may control a valve and/or pump 126 between the high pressure reservoir 122 and the pressurization chamber 110. In some embodiments, the controller 20 may also control a vent 128. The vent 128 may release the fluid 121 to a low pressure reservoir or to the environment to permit a release of fluid pressure within the valve assembly 118, thereby facilitating retraction of the valve member 116. In some embodiments, a rapid release of fluid 121 pressure may rapidly retract the valve member 116 to free any undesirably blockage in the outlet 34, or a rapid surge of fluid 121 pressure into the pressurization chamber 110 may rapidly extend the valve member 116 to completely seal off the outlet 34 to isolate the downstream system 18 from the upstream system 16 and the solid feed pump 14. FIG. 3 illustrates a fully retracted position 130 (dashed lines), an intermediate position 131 (solid lines), and a fully extended position 132 (dashed lines) of the linearly movable valve member 115 that forms the dynamic seal 13.

In some embodiments, the controller 20 actively directs fluid 121 to and from the pressurization chamber 110 to control the position of the valve 12 (e.g., valve member 116) in response to at least one sensor feedback. As described above, the controller 20 may receive sensor feedback from sensors 24 in the upstream system 16, the solid feed pump 14, the fluid actuated valve 12, and/or the downstream system 18. In some embodiments, a differential pressure measurement between the pressurization chamber 110 and a pressure tap 134 in the valve chamber 82 may be obtained from one or more sensors 24 to adjust the position of the valve member 116 and compaction of the solid feed flow 22. Alternatively or additionally, a differential pressure measurement between the pressurization chamber 110 and the external environment 136 may be obtained from one or more sensors 24 to adjust the position of the valve member 116 and compaction of the solid feed flow 22. For example, the controller 20 may adjust the position of the valve member 116 to maintain a substantially constant pressure on the solid feed flow 22 at the pump outlet 34, which may result in a generally uniform dynamic seal 13 (e.g., solids compaction) and solid feed flow 22. In some embodiments, the controller 20 may adjust fluid pressure in the pressurization chamber 110 to maintain a substantially constant position of the fluid actuated valve 12 (e.g., valve member 116) as sensed by a valve position sensor 138. In some embodiments, the controller 20 may adjust the fluid pressure in the pressurization chamber 110 to be approximately equal to the pressure in the valve chamber 82. Thus, the controller 20 may provide a closed loop control of the fluid actuated valve 12 between the solid feed pump 14 and the fluid actuated valve 12. This closed loop system may be used to maintain a steady solid feed flow 22 and steady pressure at the pump outlet 34.

In some embodiments, the controller 20 may provide an adjustable level of resistance on the solid feed flow 22 based on signal feedback from the system to reduce variations in the performance of the solid feed pump 14. For example, if it is desired to keep the solid pump leak gas fluctuations within a limited range, the controller 20 may adjust the load that the valve member 116 places on the solid feed flow 22. Adjusting the load on the solid feed flow 22 may affect the level of compaction and permeability of the solid feed flow 22, and thus the effectiveness of the dynamic seal 13. The controller 20 may actively control the fluid actuated valve 12 to move the valve member 116 to exert a constant load on the solid feed flow 22. As another example, the controller 20 may actively control the valve 12 to move the valve member 116 to the fully extended position 132 to completely close the outlet 34, thereby isolating the upstream system 16 and the solid feed pump 14 from the downstream system 18 in response to a sudden sensed increase in the pressure of the downstream system 18. As yet another example, the controller 20 may actively control the valve 12 to retract the valve member 116 in response to sensor feedback from the downstream system 18, indicating a pressure decrease and/or a need for more feedstock.

Additionally, the controller 20 may actively control the fluid actuated valve 12 to move the valve member 116 to reduce fluctuations in the sensor feedback related to the torque of the solid feed pump 14. In some situations, a low torque may indicate that solid feed flow 22 may not have adequate pressure to block backflow of fluid (e.g., liquid or gas) from the downstream system 18 into the solid feed pump 14 and/or the upstream system 16. For example, if a sensor 24 measures a low torque of the solid feed pump 14, the controller 20 may extend the fluid actuated valve 12 to increase the compaction of the solid feed flow 22 (i.e., to increase the effectiveness of the dynamic seal 13). Increasing the compaction of the solid feed flow 22 may increase the pressure at the solid pump outlet 34. At higher pressures, the solid feed pump 14 may operate with higher torque to maintain a solid feed flow 22. The controller 20 may adjust the position of the fluid actuated valve 12 and pressure within the pressurization chamber 110 in response to any sensed feedback from one or more sensors 24 to adjust the compaction, permeability, and flow rate properties of the solid feed flow 22 leaving the solid feed pump 14. Any of these adjustments may improve the performance of the solid feed pump 14 and/or the downstream system 18 under various operating conditions.

In some embodiments, the controller 20 may actively control the fluid actuated valve 12 in response to direct input 140 (e.g., via a user interface) from an operator, such as input to open or close the fluid actuated valve 12. For example, during startup, the dynamic seal 13 in the pump 14 may be used to isolate the upstream system 16 from the downstream system 18. Startup procedures may include startup of various processes, such as gasification processes, combustion processes, or other reactor processes. The controller 20 may actively control the fluid actuated valve 12 to adjust the valve member 116 to form an effective dynamic seal 13 (e.g., solids compaction in the outlet 34) in direct response to operator input 140, startup control logic, sensor 24 feedback, or any combination thereof. For example, during startup, the valve member 116 may be moved to the fully extended position 132 or the intermediate position 131 to more quickly compact the solid feed flow 22 and develop the dynamic seal 13 to contain rapid buildup of pressure in the outlet 34. As the solids compaction or pressure in the outlet 34 increases, the effective sealing pressure of the dynamic seal 13 also increases to help isolate greater pressure differentials between fluid pressures (e.g., gas or liquid pressures) in the upstream and downstream systems 16 and 18. In this manner, the downstream system 18 (e.g., gasifier, combustor, or reactor) may be ramped up to normal operation at an accelerated rate. In some embodiments, the controller 20 may actively control the fluid actuated valve 12 to hold the valve member 116 in the fully extended position 132 until the effective sealing pressure of the dynamic seal 13 is approximately equal to or greater than the pressure of the downstream system 18. At this point, the controller 20 may actively control the fluid actuated valve 12 to gradually retract the valve member 116 to discharge the solid feed flow 22, while still ensuring sufficient compaction or pressure of the solids maintain the dynamic seal 13 between the upstream and downstream systems 16 and 18.

In some embodiments as illustrated in FIG. 3, a sight glass 142 through the pump outlet 34 provides an operator or a camera 143 a view into the valve chamber 82. Observations made through the sight glass 142 by either an operator or camera 143 may provide feedback to the controller 20 regarding the position of the fluid actuated valve 12 (e.g., valve member 116) or properties of the solid feed flow 22. The controller 20 may adjust the fluid actuated valve 12 in response to direct input from the operator or camera 143 due to observations made through the sight glass 142. For example, the controller 20 may extend the fluid actuated valve 12 in response to a loose compaction of the solid feed flow 22 observed through the sight glass 142.

In some embodiments, the controller 20 may provide design flexibility to enable the solid feed pump 14 to operate optimally for a plurality of different solid feedstocks 26. As described above, solid feedstocks 26 may include a wide range of materials (e.g., coal, biomass, and petroleum coke). Each type of feedstock 26 may have different properties, such as moisture content, energy content, density, particulate size, among others. The solid feed pump 14 may produce a solid feed flow 22 with different compaction, permeability, and flow rate characteristics depending upon the type and properties of the solid feedstock 26 entering through the pump inlet 30. The controller 20 may actively adjust the position of the fluid actuated valve 12 and load on the valve 12 to affect the compaction, permeability, and flow rate of the solid feed flow 22, as well as the dynamic seal 13. This may improve the performance of the solid feed pump 14 and the downstream system 18 when the solid feedstock 26 is changed during operation, thereby providing operational flexibility. For example, the system 10 may operate with a coal feedstock, then shift to an asphalt feedstock. For any flow rate of these two feedstocks, the compaction and permeability may be different, leading to different pump performance characteristics. An actively controlled fluid actuated valve 12 may make adjustments dynamically during operation regardless of the feedstock 26, providing additional flexibility and versatility to the solid feed pump 14.

Figure 4:
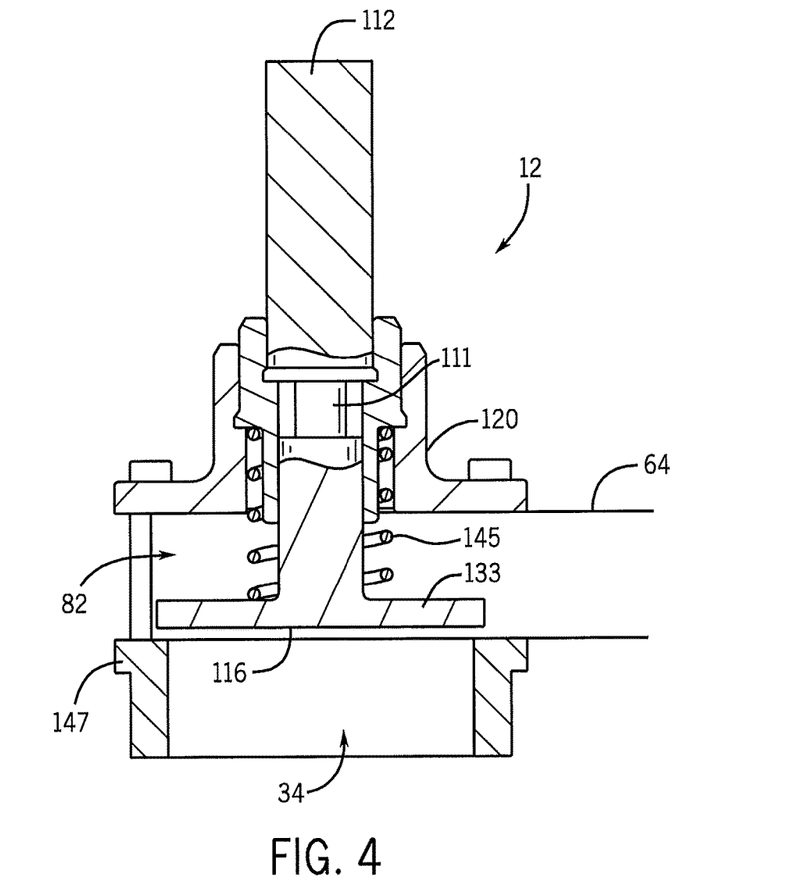
FIG. 4 is a schematic cross-sectional diagram of an embodiment of a linearly movable actuated valve and spring check valve for the solid feed pump of FIGS. 1 and 2.

FIG. 4 illustrates an embodiment of an actuated valve with a spring check valve. In some embodiments, the actuated valve 12 may be actively controlled by the controller 20, and passively controlled by a spring 145 or other passive means. The spring 145 may exert a force on the piston 112 to move the movable valve member 116 to a default position 133. The default position 133 may be the position of the movable valve member 116 without active control by the controller 20. The spring 145 may act as a check valve to isolate the pump 14 when the default position 133 extends the valve member 116 to the valve seat 147. For example, in the event of an error with the controller 20, the spring 145 may close the valve 12. The spring 145 may provide increased flow without active control if the default position 133 is substantially the same as the fully retracted position 130. Embodiments with the default position 133 in an intermediate position 131 may provide a default compaction and permeability level without active control. In some embodiments, the controller 20 may actively control the valve 12 to move the valve member 116 from the default position 133 as described above. For example, after startup, the controller 20 may retract the movable valve member 116 to permit the solid feed flow 22 to pass through the valve 12.

Figure 5:
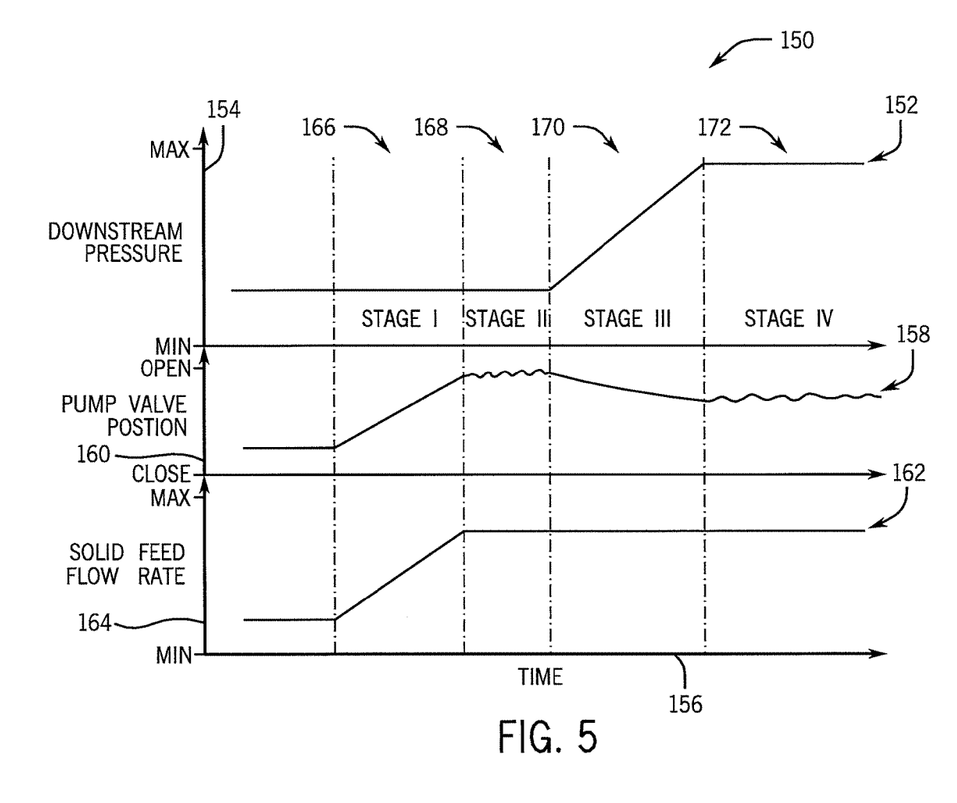
FIG. 5 is a chart of an embodiment illustrating the pressure, extension of the actively controlled valve, and solid flow rate of solid feed pump of FIG. 1 while feeding a gasifier at start-up.

FIG. 5 is a chart of an embodiment of a startup procedure 150 for a typical gasifier, illustrating a first plot 152 of downstream pressure 154 versus time 156, a second plot 158 of valve position 160 versus time 156, and a third plot 162 of solid feed flow rate 164 versus time 156. Furthermore, the startup procedure 150 includes a first stage 166, a second stage 168, a third stage 170, and a fourth stage 172. The first plot 152 illustrates the change in the downstream pressure 154 versus time 156 for the downstream system 18, such as a gasifier. For example, the downstream pressure 154 may gradually ramp up in the gasifier as the solid feed flow 22 is gasified in the gasifier. The second plot 158 illustrates the change in the position of the valve 12 (e.g., valve member 116) of the solid feed pump 14, wherein a minimum or open position of the valve 12 corresponds to the fully retracted position 130 of the valve member 116 and the maximum or closed position of the valve 12 corresponds to the fully extended position 132 of the valve member 116. The third plot 162 illustrates the change in solid feed flow 22 through the solid feed pump 14 to the downstream system 18.

Before startup begins with stage one 166, the downstream pressure 154 may be atmospheric pressure (or another minimal pressure) as indicated by the first plot 152, the valve position 160 may be completely or substantially closed (e.g., fully extended position 130) as indicated by the second plot 158, and the solid feed flow rate 164 may be generally zero as indicated by the third plot 162. In the first stage 166 of the depicted embodiment, the downstream pressure 154 may remain unchanged at atmospheric pressure (or another minimal pressure) as indicated by the first plot 152, the valve position 160 may gradually move from the closed position (e.g., fully extended position 130) toward the open position (e.g., extended position 132) as indicated by the second plot 158, and the solid feed flow rate 164 may gradually increase from a minimum rate toward a maximum rate as indicated by the third plot 162. For example, during the first stage 166, the valve position 160 (e.g., valve member 116 of the valve 12) may progressively decrease blockage of the outlet 34 of the pump 14 to open between 20 to 100, 40 to 90, 60 to 80, or 70 to 75 percent of the outlet 34. By further example, during the first stage 166, the valve position 160 (e.g., valve member 116 of the valve 12) may progressively decrease blockage of the outlet 34 of the pump 14 to open greater than approximately 25, 35, 45, 55, 65, 75, 85, or 95 percent of the outlet 34. During this movement of the valve position 160 in the first stage 166, the solid feed flow rate 164 (e.g., solid feed flow 22) and dynamic seal 13 (e.g., compacted solids in the outlet 34) may progressively increase as well. For example, the increases in valve position 160 and solid feed flow rate 164 may follow a linear path, a non-linear path (e.g., a curved path), or any combination thereof. At this point, the startup procedure 150 proceeds with the second stage 168.

In the second stage 168 of the depicted embodiment, the downstream pressure 154 may remain unchanged at atmospheric pressure (or another minimal pressure) as indicated by the first plot 152, the valve position 160 may oscillate up and down (e.g., slightly further open and slightly further closed) as indicated by the second plot 158, and the solid feed flow rate 164 may remain relatively steady (e.g., substantially constant) as indicated by the third plot 162. For example, during the second stage 168, the valve position 160 (e.g., valve member 116 of the valve 12) may fluctuate by a small percentage (e.g., +/−1 to 10 percent of a partially open position) to help steady the solid feed flow rate 164 (e.g., flow 22) and ensure a sufficient dynamic seal 13 (e.g., compacted solids in the outlet 34). As discussed in detail above, the fluctuations in valve position 160 may correspond to feedback control using the controller 20 and feedback from one or more sensors 24. Thus, the valve position 160 is adjusted to help control the flow rate 164 and dynamic seal 13. At this point, the startup procedure 150 proceeds with the third stage 170. In some embodiments, the valve position 160 may extend into the flow 22 to increase resistance on the flow 22 to control the compaction of the solid feed flow 22, and thus form a dynamic seal 13 of the solid feed flow 22 in the outlet 24 of the pump 14.

In the third stage 170 of the depicted embodiment, the downstream pressure 154 may gradually increase as indicated by the first plot 152, the valve position 160 may gradually increase as indicated by the second plot 158, and the solid feed flow rate 164 may remain relatively steady (e.g., substantially constant) as indicated by the third plot 162. For example, during the third stage 170, the downstream process 18 (e.g., gasifier) may gradually increase in temperature and pressure as the solid feed flow 22 is gasified in a gasifier. Simultaneously, while the pressure 154 increases, the valve position 160 may be adjusted thereby maintaining a substantially constant flow rate 164 (e.g., flow 22) to the gasifier while maintaining an effective dynamic seal 13 (e.g., compacted solids in the outlet 34). This adjustment may be in the open or closed direction depending on the material characteristics e.g. compressibility, permeability etc. In some embodiments, the valve position 160 (e.g., valve member 116 of the valve 12) may partially open by a percentage of 10 to 40 percent of the fully closed position. For example, the valve position 160 (e.g., valve member 116 of the valve 12) may move from an initial third stage 170 position of approximately 60 to 80 percent fully closed to a final third stage 170 position of approximately 40 to 70 percent fully closed. At this point, the startup procedure 150 proceeds with the fourth stage 172.

In the fourth stage 172 of the depicted embodiment, the downstream pressure 154 may remain unchanged at an elevated pressure (e.g., steady state operating pressure of the gasifier or other downstream system 18) as indicated by the first plot 152, the valve position 160 may oscillate up and down (e.g., slightly further open and slightly further closed) as indicated by the second plot 158, and the solid feed flow rate 164 may remain relatively steady (e.g., substantially constant) as indicated by the third plot 162. For example, during the fourth stage 172, the valve position 160 (e.g., valve member 116 of the valve 12) may fluctuate by a small percentage (e.g., +/−1 to 10 percent) to help steady the solid feed flow rate 164 (e.g., flow 22) and ensure a sufficient dynamic seal 13 (e.g., compacted solids in the outlet 34). As discussed in detail above, the fluctuations in valve position 160 may correspond to feedback control using the controller 20 and feedback from one or more sensors 24. Thus, the valve position 160 is adjusted to help control the flow rate 164 and dynamic seal 13.

Figure 6:
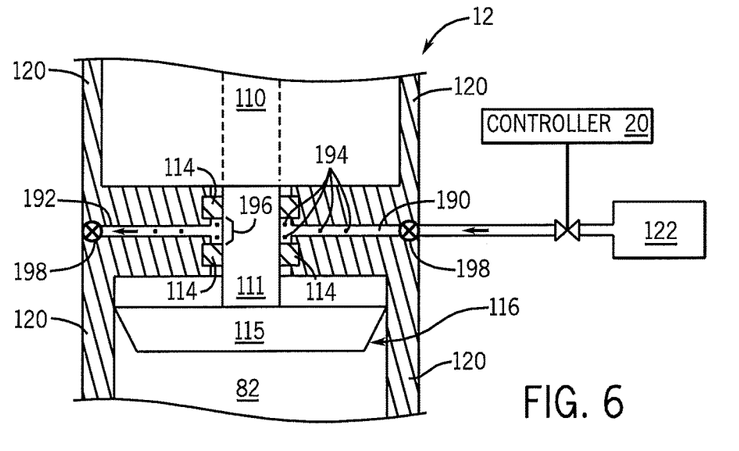
FIG. 6 is a schematic cross-sectional diagram of an embodiment of a seal of a fluid actuated valve with venting and purging features.
Figure 7:
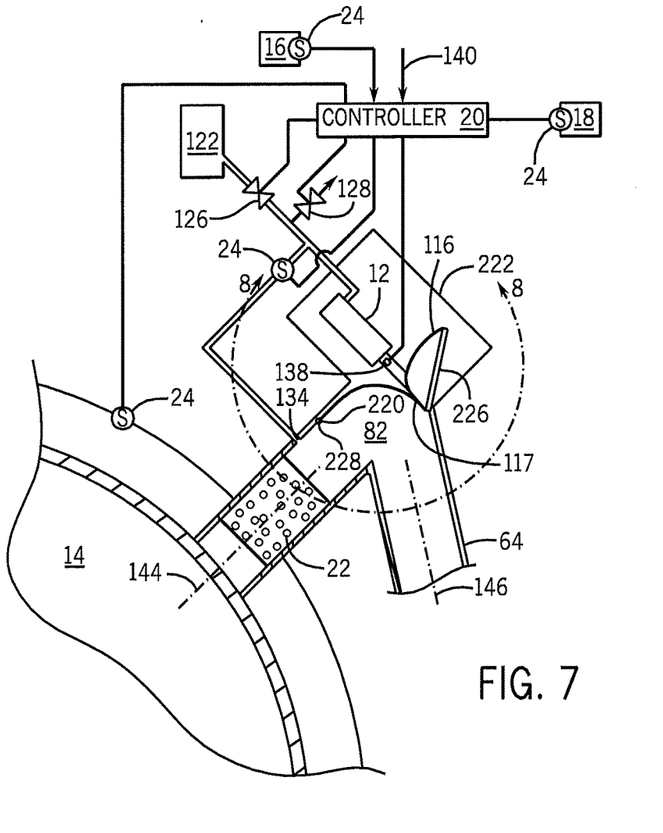
FIG. 7 is a schematic cross-sectional diagram of an embodiment of a rotatably movable fluid actuated valve and controller.
Figure 8:
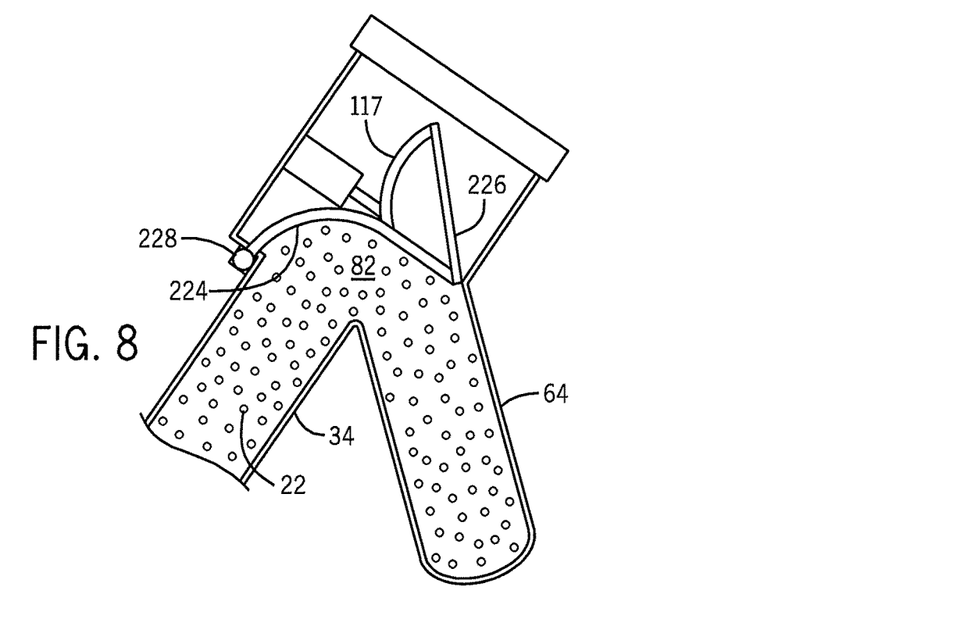
FIG. 8 is a schematic cross-sectional diagram of an embodiment of the rotatably movable fluid actuated valve of FIG. 7, taken along line 8-8, in a retracted position.
Figure 9:
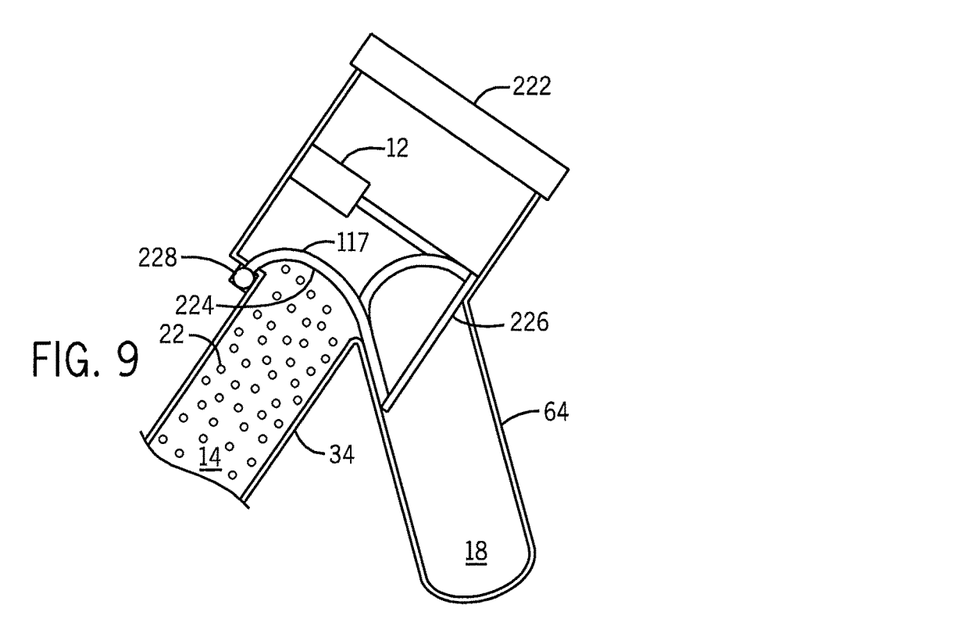
FIG. 9 is a schematic cross-sectional diagram of an embodiment of the rotatably movable fluid actuated valve of FIG. 7, taken along line 8-8, in an extended position.

The fluid actuated valve 12 may adjust the compaction of the solid feed flow 22 through a linearly movable valve member 115 (FIGS. 3 and 6) or a rotatably movable valve member 117 (FIGS. 7-9). Both the linearly movable valve member 115 and the rotatably movable valve member 117 may extend into the valve chamber 82 when actuated, and both may dynamically seal the upstream system 16 and solid feed pump 14 from the downstream system 18. Additionally, both the linearly movable valve member 115 and the rotatably movable valve member 117 may be actively controlled by a controller 20 to adjust the compaction of the solid feed flow 22 in response to sensed feedback.

In some embodiments, the fluid actuated valve 12 is coupled to a linearly movable valve member 115 as illustrated in FIG. 3. The linearly movable valve member 115 may be disposed directly opposite the solid feed pump outlet 34 along a shared outlet axis 144. This disposition of the linearly movable valve member 115 may primarily place axial loads from the solid feed flow 22 on the rod 111. In some embodiments, the linearly movable valve member 115 (i.e., valve head) coupled to the rod 111 and piston 112 may correspond to the geometry of the pump outlet 34, so that a fully extended linearly movable valve member 115 may form a seal between the solid feed pump 14 and the downstream system 18, sealing the feed pump 14 and upstream system 16 from the downstream system 18 In some embodiments, the rod 111 may be exposed to the downstream system 18 through the downstream exit pipe 64 when the piston 112 is extended. In other embodiments, the linearly movable valve member 115 is larger than the exit pipe 64, so that when the piston 112 is fully extended, the rod 111 is not exposed to the environment of the downstream system 18. In other embodiments, the linearly movable valve member 115 may be disposed along an axis parallel to the outlet axis 144. In another embodiment, the linearly movable valve member 115 may be disposed along an axis perpendicular (e.g., out of the page of FIG. 3) to the outlet axis 144 and the exit axis 146. In this embodiment, a larger linearly movable valve member 115 seals the downstream system 18 from the rod 111 and piston 112.

As illustrated in FIG. 6, one or more seals 114 may block particulates (e.g., coal dust) or gases from entering the fluid actuated valve 12, particularly the pressurization chamber 110. In an embodiment, the seals 114 may include, but are not limited to gaskets, O-rings, and lip seals. Additionally, in some embodiments, a purge inlet 190 and a vent outlet 192 may be disposed in the valve housing 120 between a plurality of seals 114 (e.g., axially offset lip ring seals) to aid removal of foreign objects and isolate the pressurization chamber 110 from the valve chamber 82. For example, a controller 20 may direct a high pressure fluid, such as an inert gas (e.g., nitrogen), through the purge inlet 190 to purge foreign materials 194 (e.g., coal dust) from the piston cavity 196 between the seals 114. The purged materials 194 and high pressure fluid are transmitted out the vent outlet 192. In some embodiments, the purge inlet 190 and vent outlet 192 include check valves 198 that remain closed unless a high pressure fluid is directed through the purge inlet 190.

In other embodiments, the fluid actuated valve 12 is coupled to a rotatably movable valve member 117 as illustrated in FIG. 7. The rotatably movable valve member 117 (i.e. valve head) may include a hinged flap valve. In some embodiments, a rotary actuator may rotate the rotatably movable valve member 117 or a flap valve to isolate the pump 14 from the downstream system 18 or to affect the compaction and permeability of the solid fuel flow. The controller 20 may extend the fluid actuated valve 12 to rotate the rotatably movable valve member 117 about an axis 220 (e.g., rotatable joint) to affect the compaction, permeability, and flow rate of the solid feed flow 22. In some embodiments, the fluid actuated valve 12 is disposed in a control chamber 222. When the fluid actuated valve 12 is fully extended, the primary seal 224 of the rotatably movable valve member 117 may form a first sealed interface between solid feed pump 14 and the control chamber 222. In some embodiments, the rotatably movable valve member 117 includes a secondary seal 226, which is configured to form a second sealed interface between the control chamber 222 and the downstream system 18 while the valve 12 is in the fully extended position 224. In an embodiment, the secondary seal 226 may seal the control chamber 222 from the downstream system 18 for all dispositions of the rotatably movable valve member 117. For example, the secondary seal 226 may remain in contact with at least part of the exit pipe 64 for all dispositions of the rotatably movable valve member 117. In other embodiments, the rotatably movable valve member 117 does not include the secondary seal 226 and the fluid actuated valve 12 may include the seals 114 described above with respect to the linearly movable valve member 115 of FIG. 6.

The fluid actuated valve 12 may be rigidly coupled to the control chamber 222 and the rotatably movable valve member 117. The rotatably movable valve member 117 may be coupled to the valve chamber 82 by a hinge 228 opposite the exit pipe 64. In some embodiments, the piston 112 of the fluid actuated valve 12 may be coupled to the rotatably movable valve member 117 such that as the piston 112 extends, the rotatably movable valve member 117 pivots about the hinge 228 while the secondary seal 226 maintains a seal between the control chamber 222 and the downstream system 18. FIG. 8 illustrates an embodiment of the fluid actuated valve 12 and rotatably movable valve member 117 in a fully retracted position. In this position, the rotatably movable valve member 117 may have a minimal effect on the solid feed flow 22 flowing from the outlet 34 through the valve chamber 82 and out through the exit pipe 64. FIG. 9 illustrates an embodiment of the fluid actuated valve 12 and rotatably movable valve member 117 in a fully extended position, where the rotatably movable valve member 117 has pivoted about the hinge 228. The primary seal 224 may isolate the control chamber 222 from the pump 14 and upstream system 16, and the secondary seal 226 may isolate the control chamber 222 from the downstream system 18. In this embodiment, the rotatably movable valve member 117 may isolate the feed pump 14 and upstream system 16 from the downstream system 18. The fluid actuated valve 12 may extend or retract to positions between the embodiments shown in FIGS. 8 and 9 to affect the level of compaction and permeability of the solid feed flow 22.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:
1. A system, comprising:
   a solid feed fuel pump, comprising:
      a solid feed flow path configured to route a solid fuel flow from an inlet to an outlet; and
      an actuated valve disposed in the outlet, wherein the actuated valve is configured to adjust a compaction of the solid fuel flow in the outlet in response to active control based on at least one sensed feedback received from a downstream system coupled to the outlet of the solid feed pump, and wherein the actuated valve comprises a rotatably movable valve member configured to rotate about a hinge coupled to the outlet to adjust the compaction of the solid fuel flow.

2. The system of claim 1, wherein the actuated valve comprises a hydraulically actuated valve.

3. The system of claim 1, wherein the actuated valve comprises a pneumatically actuated valve.

4. The system of claim 1, wherein the actuated valve comprises an electrically actuated valve.

5. The system of claim 1, comprising a controller configured to provide the active control based on the at least one sensed feedback.

6. The system of claim 5, wherein the controller is configured to provide the active control based on an upstream feedback associated with an upstream system coupled to the inlet, a downstream feedback associated with a downstream system coupled to the outlet, or a pump feedback associated with the solid feed fuel pump.

7. The system of claim 5, wherein the at least one sensed feedback comprises an inlet pressure at the inlet, an outlet pressure at the outlet, a torque of the solid feed fuel pump, a position of the actuated valve, a load on the actuated valve, a leakage of the solid feed fuel pump, or a combination thereof.

8. The system of claim 1, comprising an upstream system coupled to the inlet of the solid feed fuel pump, wherein the upstream system comprises a fuel preparation system configured to prepare a solid carbonaceous fuel as a solid feed for the solid feed fuel pump.

9. The system of claim 1, comprising a downstream system coupled to the outlet of the solid feed fuel pump, wherein the downstream system comprises a gasifier configured to gasify the solid fuel flow.

10. The system of claim 1, comprising an exit pipe coupled to the outlet, wherein the hinge is disposed opposite the exit pipe.

11. The system of claim 1, wherein the actuated valve comprises a primary seal and a secondary seal, wherein the primary seal is configured to isolate the outlet from a control chamber of the actuated valve when the actuated valve is closed, and the secondary seal is configured to isolate the control chamber from a downstream system coupled to the outlet.

12. A system, comprising:
a solid feed pump controller configured to provide active control of a fluid actuated valve coupled to an outlet of a solid feed fuel pump based on at least one sensed feedback, wherein the active control is configured to adjust a compaction of a solid fuel flow in the outlet, and the at least one sensed feedback comprises a downstream feedback associated with a downstream system coupled to the outlet of the solid feed fuel pump, wherein the downstream feedback is associated with a gasification system.

13. The system of claim 12, wherein the solid feed pump controller is configured to provide the active control based on an upstream feedback associated with an upstream system coupled to an inlet of the solid feed fuel pump, or a pump feedback associated with the solid feed fuel pump.

14. The system of claim 13, wherein the at least one sensed feedback comprises an inlet pressure at an inlet of the solid feed fuel pump, an outlet pressure at the outlet of the solid feed fuel pump, a torque of the solid feed fuel pump, a position of the fluid actuated valve, a load on the fluid actuated valve, a leakage of the solid feed fuel pump, or a combination thereof.

15. The system of claim 13, wherein the at least one sensed feedback comprises an upstream feedback associated with a fuel preparation system.

16. The system of claim 12, comprising the solid feed fuel pump, the fluid actuated valve, or a combination thereof.

17. The system of claim 12, comprising the fluid actuated valve, wherein the fluid actuated valve comprises a rotatably movable valve member configured to rotate about a hinge coupled to the outlet to adjust the compaction of the solid fuel flow.

18. A method, comprising:
actively controlling a fluid actuated valve coupled to an outlet of a solid feed pump based on at least one sensed feedback, wherein actively controlling comprises adjusting a compaction of a solid flow in the outlet; and
receiving the at least one sensed feedback from a downstream system coupled to the outlet of the solid feed pump.

19. The method of claim 18, wherein the at least one sensed feedback comprises an inlet pressure at an inlet of the solid feed pump, an outlet pressure at the outlet of the solid feed pump, a torque of the solid feed pump, a position of the fluid actuated valve, a load on the fluid actuated valve, a leakage of the solid feed pump, or a combination thereof.

20. The method of claim 18, comprising receiving the at least one sensed feedback from an upstream system coupled to an inlet of the solid feed pump.

* * * * *